United States Patent [19]
Heimke et al.

[11] 3,924,274
[45] Dec. 9, 1975

[54] ADJUNCT AND METHOD FOR FACILITATING IMPLANTATION OF JOINT PROSTHESES

[75] Inventors: Gunther Heimke, Mannheim; Peter Griss, Plankstadt; Hanns Frhr. von Andrian-Werburg, Ilvesheim, all of Germany

[73] Assignee: Friedrichsfeld GmbH Steinzeug-und Kunststoffwerke, Mannheim, Germany

[22] Filed: July 3, 1974

[21] Appl. No.: 485,617

[30] Foreign Application Priority Data
July 7, 1973  Germany............................ 2334643

[52] U.S. Cl.................... 3/1.91; 3/1.913; 128/92 C; 128/92 CA
[51] Int. Cl.²............................................ A61F 1/24
[58] Field of Search........................ 3/1, 1.9–1.913; 128/92 C, 92 CA, 92 R, 334 R, 335.5; 32/10 A

[56] References Cited
UNITED STATES PATENTS

| | | | |
|---|---|---|---|
| 2,092,512 | 9/1937 | Herrmann et al................ | 128/335.5 |
| 2,127,903 | 8/1938 | Bowen............................. | 128/334 R |
| 2,508,690 | 5/1950 | Schmerl............................ | 128/276 |
| 3,225,766 | 12/1965 | Baptist et al..................... | 128/335.5 |
| 3,683,926 | 8/1972 | Suzuki................................ | 3/1 X |

*Primary Examiner*—Ronald L. Frinks

[57] ABSTRACT

Implantation of joint prostheses by means of mineral cement adhesives is facilitated by using a temporary barrier shield of biologically compatible material between the cement and the bone tissue to prevent contact until the cement is hardened, after which the barrier material is resorbed by the tissue.

7 Claims, 3 Drawing Figures

AN ADJUNCT AND METHOD FOR FACILITATING IMPLANTATION OF JOINT PROSTHESES

The invention relates to an aid for the attachment of prostheses by means of a mineral cement in a bone cavity.

Hitherto, plastic bone cements were used for the attachment of a prosthesis, which harden in the moist environment of the bone cavity. This, however, has the disadvantage that the plastic bone cement ages in the course of a few years, so that the prosthesis becomes loose.

Furthermore, the use of plastic bone cements may result in more or less pronounced poisoning phenomena, which destroy the surrounding tissue and in the worst case can also lead to the death of the patient.

Also the plastic bone cement during hardening develops a heat of 70°C.–80°C. in the border surface toward the bone; at this temperature the cell tissue of the bone is destroyed and must be reproduced again during healing process that lasts several months.

On the other hand, it has been known to use mineral cements which have the disadvantage, that they dry only in a dry environment. For example, in the building industry, building cements are used and in dental medicine, zinc phosphate cements, silicate cements, stone phosphate cements or silico phosphate cements. All these mineral cements could be used in principle for the attachment of prostheses in bone cavities, but they have the disadvantage, that the blood as well as the other body fluids flowing back into the bone cavity disturb the drying of the mineral cements.

This invention is based on the principle of utilizing a device which makes it possible to use mineral cements for the attachment of a prosthesis in a bone cavity.

According to the invention this task is accomplished by using a thin flexible material which may be characterized by a foil, or thin flexible film of material, which is resorbable in a biological environment. This foil which is obtainable commercially, can be inserted into the bone cavity where it completely seals the cavity in the bone from blood or other body liquids which flow out, for at least the duration of the hardening of the cement.

Representative compositions which can be used in the making of such a foil barrier, although not to be considered as limitative, are disclosed in U.S. Pat. Nos. 2,092,512 and 3,225,766.

The foil, according to the invention, makes possible the use of hitherto unusable cements, which are more compatible with the bone tissue over prolonged periods of time and which age far less; that is to say, in the course of many years, they do not become brittle. It would also be possible, using the foil according to the invention, to use mineral cements which are decomposed by the body in the course of a few years and are replaced by tissues of the body; the use of such cements has been hitherto unsuccessful because of the fact that their complicated drying mechanism was disturbed by the tissue fluid, for example, by the blood.

Advantageously, the foil is preformed corresponding to the shape of the bone cavity as, for example, in the form of a small pouch.

It is also recommended that the foil be provided with a projecting edge, so that the latter will cover up the bone area surrounding the opening of the bone cavity and will protect it from contact with the mineral cement. In the case of a small pouch, this projecting covering edge is then arranged at the opening of the cavity.

The invention will be explained on the basis of the annexed drawings in which

Figure 3:
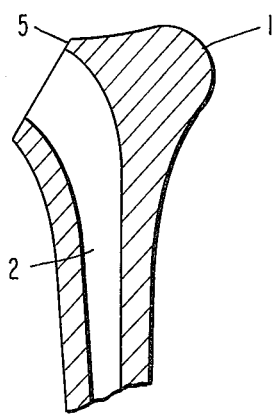
FIG. 3 is a cross-section of the cavity in a femur.

In FIG. 3, the upper part of the thigh bone is shown. The femur head has already been separated and the space for the marrow has been opened for the insertion of the prosthesis. The reference numeral 1 designates the bone, and 2, the bone cavity. After opening the space containing the marrow and preferably after its correct shaping by means of a rasp, the foil pouch 3 is inserted into the bone cavity 2.

Figure 1:
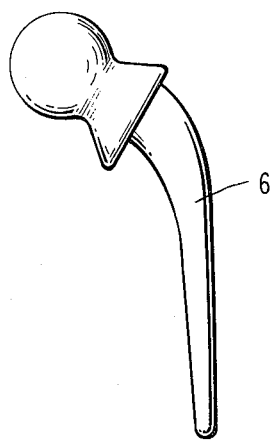
FIG. 1 illustrates by way of example, the femur head part of a typical hip joint prosthesis.
Figure 2:
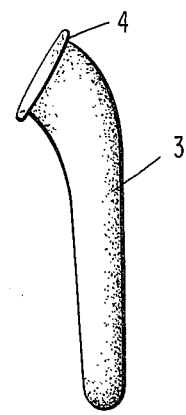
FIG. 2 illustrates a sac, or pouch made of suitable resorbable material.

In order to achieve a close fit of the foil pouch 3, a further aid, for example a known test prosthesis can be used. The projecting edge 4 of the foil pouch 3 is placed on to the surface 5 of the femur 1. The inside space of the pouch 3 is filled subsequently with cement just as has been customary hitherto. In this case however, in contrast to the former surgery techniques, one may use for this purpose a mineral cement. At the proper time and prior to hardening of the cement, the shaft 6 of the prosthesis shown in FIG. 1 is inserted into the cavity 2 and is firmly seated therein by the methods customary in the past.

During the hardening process, the material of which the pouch is composed may thus be considered as forming a sort of barrier which, though it may be temporary due to its eventual resorption, suffices to prevent contact between the body fluids and the cement for a period time long enough to allow it to harden. The foil material itself is so thin that the cement, as it hardens, fills in all of the small irregularities in the surface of the cavity to an extent that it will form a bond between the prosthesis and the cavity which survives the resorption of the pouch material.

What is claimed is:

1. An aid for use in the process of implanting of a prosthesis in a bone cavity which has been prepared to receive said prosthesis and which includes the application of a mineral cement to the surface of a prosthesis capable of hardening only in a biologically fluid-free environment, comprising a hollow pouch closed at one end and open at the other composed of a barrier film of biologically compatible impermeable material to be disposed between said applied cement and the entire surface of the prepared cavity within which the prosthesis is to be implanted, said impermeable material being resorbable in a biological environment.

2. The invention defined in claim 1, wherein said barrier comprises an elongated pouch of said resorbable impermeable material having a configuration similar to the exterior of that portion of the prosthesis that is to be received in said cavity.

3. The invention defined in claim 2, wherein the length of said pouch is greater than the length of that portion of the prosthesis to be received in the cavity.

4. The invention defined in claim 3, wherein said pouch is provided with an outwardly projecting margin surrounding the open end to protect the area surrounding the open end of the cavity.

5. Method for implanting prostheses in a bone cavity comprising the steps of applying cement to the surface of the prosthesis to be implanted, said cement being of a type incapable of hardening in contact with bone tissue fluid, and inserting a biologically compatible impermeable barrier film of the type which is resorbable in a biological environment into said cavity between the applied cement and the bone tissue defining said cavity.

6. The method of claim 5 which also includes the step of forming said film into the approximate configuration of the interior of the cavity prior to the insertion of the barrier film into the cavity.

7. The method of claim 6, which also includes the step of forming the film into the shape of an open-ended pouch defined by the interior configuration of the cavity and extending the upper margin of the pouch peripherally outwardly over an area surrounding the open end of the cavity.

* * * * *